(12) United States Patent
Thorpe et al.

(10) Patent No.: US 12,103,175 B2
(45) Date of Patent: Oct. 1, 2024

(54) ROBOTIC APPARATUS

(71) Applicant: Process Vision Ltd., Basingstoke (GB)

(72) Inventors: Harry Thorpe, Basingstoke (GB); James Watson, Basingstoke (GB); Gisle-Andre Larsen, Basingstoke (GB); Vincent Strong, Basingstoke (GB); Simon White, Basingstoke (GB); Paul Stockwell, Basingstoke (GB)

(73) Assignee: Process Vision Ltd., Basingstoke (GB)

( * ) Notice: Subject to any disclaimer, the term of this patent is extended or adjusted under 35 U.S.C. 154(b) by 276 days.

(21) Appl. No.: 17/774,913

(22) PCT Filed: Sep. 8, 2020

(86) PCT No.: PCT/GB2020/052152
§ 371 (c)(1),
(2) Date: May 6, 2022

(87) PCT Pub. No.: WO2021/089979
PCT Pub. Date: May 14, 2021

(65) Prior Publication Data
US 2022/0410374 A1   Dec. 29, 2022

(30) Foreign Application Priority Data
Nov. 8, 2019 (GB) ..................... 1916296

(51) Int. Cl.
*B25J 9/06* (2006.01)
*B25J 11/00* (2006.01)
(Continued)

(52) U.S. Cl.
CPC ........... *B25J 9/065* (2013.01); *B25J 11/0085* (2013.01); *B25J 19/0033* (2013.01); *F16L 55/32* (2013.01); *F16L 2101/30* (2013.01); *G01M 3/005* (2013.01)

(58) Field of Classification Search
CPC .... B25J 9/065; B25J 11/0085; B25J 19/0033; F16L 55/32; F16L 2101/30
See application file for complete search history.

(56) References Cited

U.S. PATENT DOCUMENTS 10,864,640 B1 * 12/2020 Innes ..................... B08B 9/0933
2003/0147725 A1    8/2003 Glass et al.
(Continued)

FOREIGN PATENT DOCUMENTS

| CN | 105690378 A | 6/2016 |
| CN | 206840080 U | 1/2018 |
| KR | 20180010943 A | 1/2018 |

OTHER PUBLICATIONS

International Search Report and Written Opinion of International Application No. PCT/GB2020/052152, dated Dec. 14, 2020, 14 pp.
(Continued)

*Primary Examiner* — Kira Nguyen
(74) *Attorney, Agent, or Firm* — Shumaker & Sieffert, P.A.

(57) ABSTRACT

Described is a robotic apparatus (10) for investigating a confined area comprising: an articulated robot (20) for insertion into a confined area, the robotic apparatus further comprising a robot control system (30) for controlling the articulated robot. Further, the robot control system comprises a control unit (50), a robot driving means, a seal (70) for isolating the confined area from the external environment and at least one transmission member (80), wherein the control unit is configured to send control signals to the robot driving means, and the at least one transmission member extends from the robot driving means to connect to the articulated robot, the at least one transmission member extending through the seal.

25 Claims, 3 Drawing Sheets

(51) Int. Cl.
    *B25J 19/00*     (2006.01)
    *F16L 55/32*     (2006.01)
    *F16L 101/30*     (2006.01)
    *G01M 3/00*     (2006.01)

(56) References Cited

U.S. PATENT DOCUMENTS

| | | |
|---|---|---|
| 2012/0095596 A1 | 4/2012 | Cole et al. |
| 2016/0339584 A1* | 11/2016 | Esteban Finck ......... B25J 9/104 |
| 2017/0049298 A1* | 2/2017 | Hunter ................... A61B 5/067 |
| 2018/0119443 A1* | 5/2018 | Panzella ............... F04B 1/0448 |
| 2020/0173599 A1* | 6/2020 | Baxter .................... E03B 7/006 |

OTHER PUBLICATIONS

International Preliminary Report on Patentability from International Application No. PCT/GB2020/052152, dated May 10, 2022, 7 pp.

\* cited by examiner

ROBOTIC APPARATUS

This application is a national stage application under 35 U.S.C. § 371 of PCT Application No. PCT/GB2020/052152, filed Sep. 8, 2020, which claims the benefit of Great Britain Application No. 1916296.5, filed Nov. 8, 2019. The entire contents of both PCT Application No. PCT/GB2020/052152 and Great Britain Application No. 1916296.5 are incorporated herein by reference.

FIELD OF THE INVENTION

The present invention relates to a robotic apparatus, more specifically a robotic apparatus for investigating a confined.

BACKGROUND OF THE INVENTION

There are an increasing number of industrial applications where investigation of confined areas, such as piping, pipelines and vessels, is required. Such confined areas are often under pressure or vacuum, and frequently contain substances hazardous to external persons and environment and as such it is often necessary to isolate these confined areas due to their toxicity, radioactive or corrosive nature. As such, engineering and technical personnel require a safe means to regularly investigate, inspect and/or maintain these confined areas.

In particular, such confined areas are commonplace in the natural gas, refining and petro-chemicals industries, for example, within oil/gas transmission and distribution pipelines. Such piping and pipelines transport a variety of substances, with damage from corrosion, general wear, leakages and blockages and impacts leading to potentially catastrophic issues. Serious economic losses, decreased operational performance, environmental pollution and even heavy casualties may occur if regular investigation and consequent maintenance of such confined areas is not managed.

Given the chemically, environmentally and physically hazardous nature of such confined areas, robotic devices provide the safest and most realistic tool for investigation. Current solutions focus on robotic devices that are self-driven through the environment. There are a multitude of drawbacks to such devices. The drive means must be mounted to the robotic devices, increasing both the size and the weight of the device. As such these devices have limited practical use in confined areas, such as pipes. Additionally, ensuring both the driving means and the robotic device are suitable for use within these confined areas is challenging.

Embodiments of the present invention seek to address at least the problems associated with inspecting and/or maintaining these harsh environments.

SUMMARY OF INVENTION

According to the present invention, there is provided a robotic apparatus for investigating a confined area, the robotic apparatus comprising; an articulated robot for insertion into a confined area, the robotic apparatus further comprising a robot control system for controlling the articulated robot, the robot control system comprising a control unit, a robot driving means, a seal for isolating the confined area from the external environment and at least one transmission member, wherein the control unit is configured to send control signals to the robot driving means, wherein the at least one transmission member extends from the robot driving means to connect to the articulated robot, the at least one transmission member extending through said seal.

In this way, in use, the articulated robot driving means is external to both the articulated robot and the confined area. As such, the size and weight of the articulated robot is not limited by the driving means. Furthermore, the driving means can provide greater or more complex articulation of the articulated robot, as the driving means no longer has to be sized to be accommodated within the confined area. Additionally, the driving means does not have to be made suitable for use within a pressurised, or vacuum, area which may contain hazardous or corrosive substances.

Preferably, the robotic apparatus comprises a plurality of transmission members.

Preferably, the at least one transmission member extends through at least one aperture in the seal. More preferably, where the apparatus comprises a plurality of transmission members, each transmission member extends through a separate aperture in the seal.

Preferably, the seal comprises an inner seal for isolating the confined area from the external environment about the apertures in the seal, and an outer seal for isolating the confined area from the external environment such that the entire apparatus may move into and out of the confined area. In this way, movement of each individual transmission member of the at least one transmission member as well as the entire apparatus can occur independently whilst ensuring continued isolation of the confined area. Preferably, the seal comprises a plurality of sealing members. More preferably, the plurality of sealing members are arranged in series and/or a stack. Still more preferably, three sealing members are arranged in series and/or a stack.

Preferably, the seal comprises a purging cavity. In this way, the user of the robotic apparatus can be informed if one or more sealing members are compromised by analysing the contents of the purging cavity. More preferably, the seal comprises more than one purging cavity.

Preferably, the articulated robot comprises a plurality of members connected by joints. More preferably, the articulated robot comprises a plurality of members with varying member length. Still more preferably, the articulated robot comprises a plurality of members with varying member length, such that the length of members of the plurality of members proximate the robot control system is greater than the length of the members of the plurality of members removed from the robot control system. As such, finer movement may be achieved at the end of the articulated robot removed from the robot control system. Preferably, the member length varies in the golden ratio.

Preferably, one or more of the joints of the articulated robot comprises an inflatable bladder or seal. In this way, the articulated robot may isolate sections of the confined area during use.

Preferably, the articulated robot is free of void space such as sealed compartments or pressurised cavities. In this way, the internal pressure of the articulated robot is the same as the pressure within the confined area, such that damage does not occur to the articulated body in use. More preferably, the articulated robot has an open frame design.

Preferably, each joint is associated with a transmission member, such that the joint can be articulated with the transmission member. Alternatively, each joint may be articulated by more than one transmission member, or multiple joints may be articulated by the same transmission member. Preferably, one or more joints are configured to be compliantly or passively articulated.

Preferably, the driving means is configured to act upon the at least one transmission member to articulate the articulated robot. More preferably, the driving means is configured to act upon the at least one transmission member to articulate the articulated robot such that each joint of the articulated robot may be articulated independently of each other joint of the articulated robot.

Preferably, the maximum angular bending of each joint of the articulated robot is between 60 and 5 degrees. More preferably the maximum angular bending of each joint of the articulated robot is between 45 and 20 degrees. Most preferably, the maximum angular bending of each joint of the articulated robot is 30 degrees.

Preferably, the driving means comprises a push rod configured to insert and remove the articulated robot into the confined area. More preferably, the driving means comprises a push rod configured to insert and remove the articulated robot along a linear path which, in use, lies parallel to the longitudinal axis of the confined area.

Preferably, the driving means comprises a motor to power the insertion of the articulated robot into and out of the confined area. Preferably, the driving means comprises at least one motor to power the articulation of the articulated robot. More preferably, the driving means comprises a plurality of motors to power the articulation of the articulated robot. Alternatively, the driving means comprises at least one linear actuator to power the insertion of the articulated robot into and out of the confined area and the articulation of the articulated robot.

Preferably, the push rod extends into a recess or aperture within the seal.

Preferably, the at least one transmission member extends through the push rod.

Preferably, each transmission member comprises a rotatable portion and a linear driving portion. Preferably, the rotatable portion is connected to the linear driving portion via a transmission coupler.

Preferably, the rotatable portion of each transmission member is connected to a motor.

Alternatively, each transmission member is connected to a linear actuator. Preferably, each transmission member comprises at least one linear driving portion. More preferably, each joint comprises more than one transmission members. Preferably, the linear driving portions are connected via the transmission coupler.

Preferably, the transmission coupler is rotatable about the longitudinal axis of the robotic apparatus. In this way, rotation of the articulated robot about the longitudinal axis of the robotic apparatus may occur.

Preferably, the transmission coupler is located within the seal. Alternatively, the seal is located within the transmission coupler.

Preferably, the linear drive portion of each transmission member comprises a cable. Preferably, the linear drive portion of each transmission member comprises a hydraulic line. Preferably, the linear drive portion of each transmission member comprises a pneumatic line.

Preferably, the seal is located proximate to the articulated robot.

Preferably, the articulated robot comprises a fixing portion for removably retaining a tool tip. In this way, the user has freedom to select the desired tool tip before use of the articulated robot. Preferably, the articulated robot comprises a tool tip. More preferably, the tool tip comprises one or more tools, sensors, analysers and/or devices. Still more preferably, this tool tip comprises one or more of the following tools, sensors, analysers and/or devices in combination, including but not limited to; pressure, temperature, spectroscopy, acoustic, ultrasonic, electrical resistance, impedance, capacitance, eddy currents requiring wires, optical fibre, wireless devices, a camera, an illumination system, a location system, electromagnetic wave sensor, electromagnetic wave generator and laser ablation or other physical means to removing scaling and deposits.

Preferably, a signal transmission means conveys power, light and signals from the tool tip to the transmission coupler. Preferably, the tool tip is removably retained in the fixing portion of the articulated robot in such a way that power, light and signals may be conveyed from the tool tip to the transmission coupler via a signal transmission means. Preferably, the signal transmission means extends through the seal.

Preferably, the articulated robot comprises an extraction line extending from said tool tip through said articulated robot. More preferably, the extraction line extends through the seal. Still more preferably, the extraction line terminates at a reservoir.

Preferably, the robotic apparatus comprises measurement or analysis means for analysing fluid within or exiting from said extraction line. In this way, any material or fluid being extracted through the extraction line can be analysed and/or measured for presence or absence of a particular substance of interest.

Preferably, the seal comprises a plurality of apertures. More preferably, the seal comprises a plurality of apertures such that, in use, the push rod, the at least one transmission member, and/or the material extraction line and/or the signal transmission means pass through the seal into the confined area.

DETAILED DESCRIPTION OF THE INVENTION

Embodiments of the present invention will now be described by way of example only and with reference to the accompanying drawings, in which.

Figure 1:
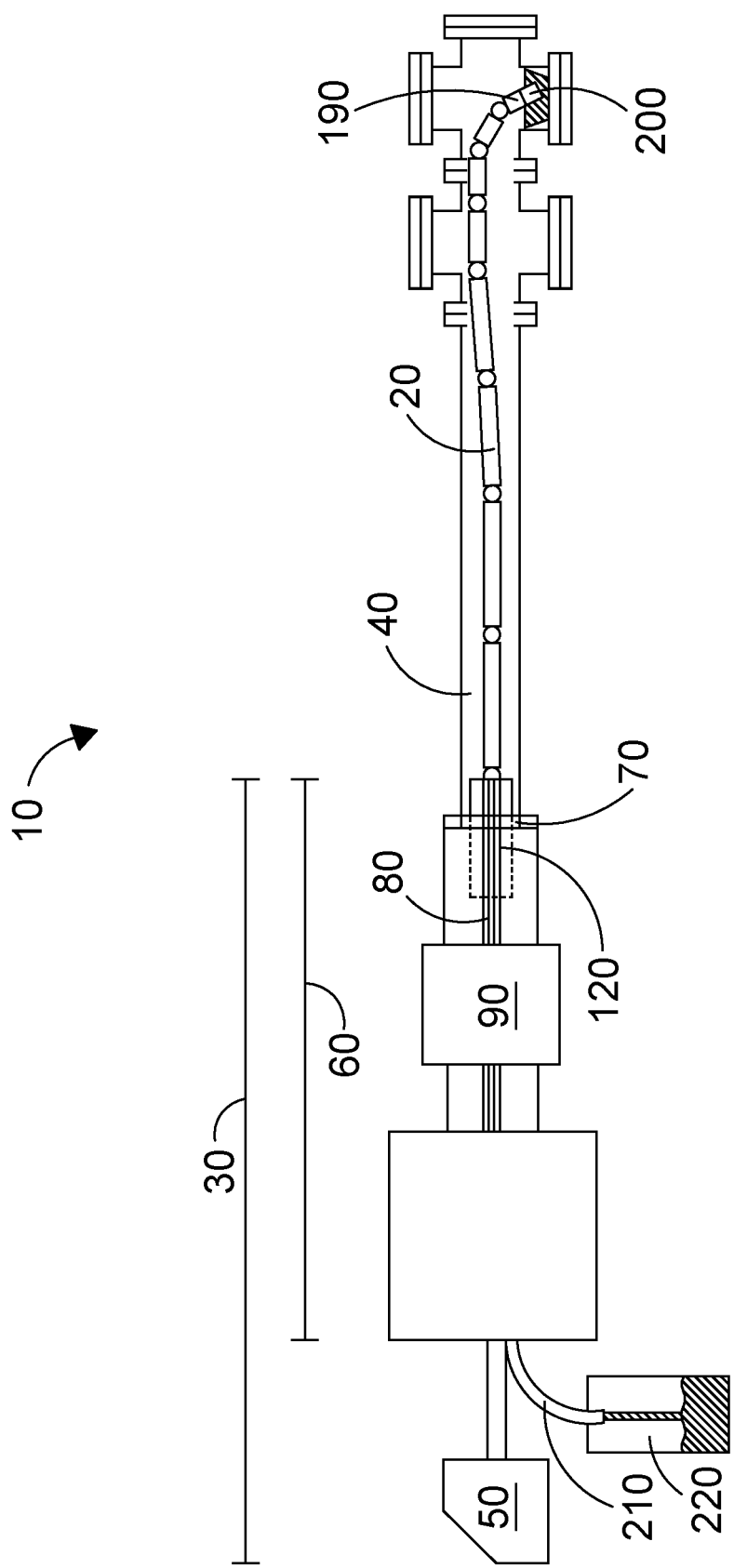
FIG. 1 depicts a robotic apparatus for investigating a confined area in accordance with the present invention.

With reference to FIG. 1, there is illustrated a robotic apparatus 10 comprising an articulated robot 20 and a robot control system 30. FIG. 1 shows the robotic apparatus in use and engaged with a pipe 40.

In use, the robot control system 30 remains external to the pipe 40 whereas the articulated robot 20 is located within the pipe 40. Additionally, in use, the longitudinal axis of the robot control system 30 is substantially parallel to the longitudinal axis of the articulated robot 20. Further, in use, the longitudinal axis of the robotic apparatus 10 is substantially co-axial with the longitudinal axis of the pipe 40.

As illustrated in FIG. 1, the robot control system 30 comprises a control unit 50, a robot driving means 60, a seal 70 and a plurality of transmission members 80. In alternative embodiments, the plurality of transmission members 80 may be a single transmission member.

The control unit 50 comprises a driver control board. During operation, the control board sends send control signals to the robot driving means 60. The control unit 50 has a user interface such that user input commands the control unit 50. The user interface may be a virtual reality (VR) system, a manually controlled joystick or an alternative envisioned by the skilled person.

The robot driving means 60 allows for articulation of the articulated robot 20 and transmission of the articulated robot 20 in to and out of a pipe 40. To achieve these functions, the robot driving means 60 comprises a drive unit (not shown) and a push rod 90.

In use, the drive unit controls the operation of the articulated robot 20 inside the pipe 40, whereas the push rod is used to manoeuvre the articulated robot 20 into the pipe 40. Here, the push rod 90 applies a linear force to the articulated robot 20 to introduce it into the pipe 40. A similar, but opposite 'pulling' linear motion is exerted by the push rod 90 on the articulated robot 20 to remove the articulated robot 20 from the pipe.

The drive unit comprises at least one motor, the characteristics controlled by the control unit 50. In an alternative embodiment, the drive unit comprises a linear actuator instead of a motor. The drive unit provides the linear force to insert and remove the articulated robot 20 into the pipe to the push rod 90. The push rod 90 extends parallel to the longitudinal axis of the robot control system 30. Additionally, the push rod 90 can be continuously and/or incrementally moved along a pathway that extends substantially coaxially to the pipe 40, such that the articulated robot 20 can be inserted and or removed from the pipe 40 as required.

Figure 2:
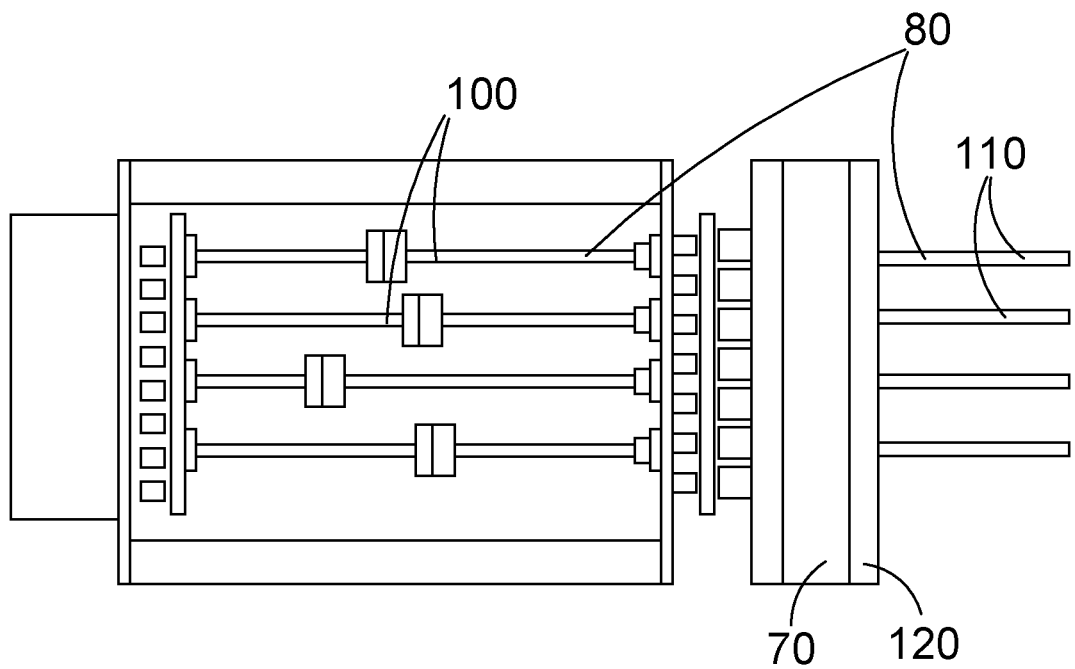
FIG. 2 depicts a side view of the plurality of transmission member within the push rod of the driving means of the robotic apparatus of FIG. 1.

With reference to FIG. 2, the plurality of transmission members 80 extend from the drive unit, through the push rod 90 and the seal 70, such that they connect to the articulated robot 20. As such, the plurality of transmission members 80 connect the drive unit to the articulated robot 20, allowing the articulated robot 20 to be controlled by a user via the control system 30.

In this embodiment, each of the plurality of transmission members 80 comprises a rotatable portion 100 and a linear driving portion 110. The rotatable portion 100 of each of the transmission members is connected to the drive unit, and the linear driving portion 110 of each transmission member is connected to the articulated robot 20. The rotatable portion 100 of each transmission member is connected to its respective and/or complimentary linear driving portion 110 via a transmission coupler 120. As such, the transmission coupler 120 converts the rotational motion of each rotatable portion 100 to a linear motion in the respective linear driving portion 110.

In an alternative embodiment, wherein the drive unit supplies linear rather than rotational motion, the rotatable portion 100 is instead a second linear driving portion.

The longitudinal axes of the plurality of transmission members 80 are substantially parallel to each other and further substantially parallel to the longitudinal axis of the robot control system 30. In this way, the articulated robot 20 can be controlled in a manner that ensures it retains a reduced diameter enabling it to operate within narrow pipes.

Figure 3:
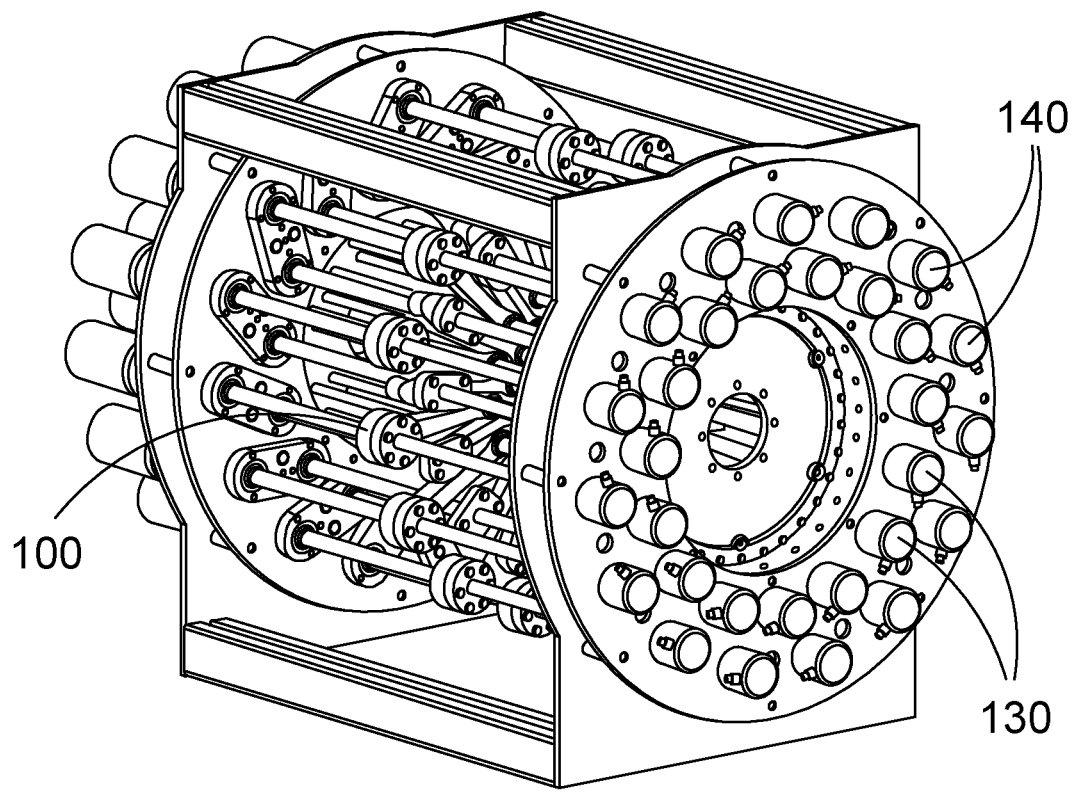
FIG. 3 depicts a perspective view of the plurality of transmission members within the push rod of the driving means of the robotic apparatus of FIG. 1.

With reference to FIG. 3, the driving means 60 has a substantially circular cross section. A substantially circular cross section is preferred as this maximises the cross-sectional area available for the driving means 60 within any given pipe. As can be seen in FIG. 3, the rotatable portions 100 of the plurality of transmission members 80 are evenly spaced about two circular paths, an inner path 130 and outer path 140. The centre point of the inner path 130 and the outer path 140 are at the centre point of the circular cross section of the driving means 60.

The plurality of transmission members 80 are equally divided between the inner path 130 and the outer path 140. As a result of this, the spacing between the plurality of transmission members 80 is smaller around the inner path 130 than the outer path 140. In another embodiment, the inner path 130 and outer path 140 are mounted on offset longitudinal planes to reduce the diameter of the drive unit.

The linear drive portion 110 of each of the transmission members within the plurality of transmission members 80 comprises a cable which connects to a joint of the articulated robot 20. Together, the cables transfer motion from the drive unit to the joints of the articulated robot 20. Every joint of the articulated robot 20 can be articulated independently of every other joint of the articulated robot 20. In this way, the movement of the articulated robot 20 can be precisely controlled.

A seal 70 defines a boundary between the inside of the pipe 40 and the external environment. The seal 70 extends across the entrance of the pipe 40. The transmission coupler 120 is located within the seal 70. Embodiments where the transmission coupler 120 is located partially or wholly within the seal 70 are envisioned by the applicant. In use, the seal 70 is located near the end of the driving means 60, such that the control unit 50 and driving means 60 are external to the pipe 40. The seal 70 forms a barrier around the transmission coupler 120, such that the environment within the pipe 40 is contained and separated from the general environment.

Figure 4:
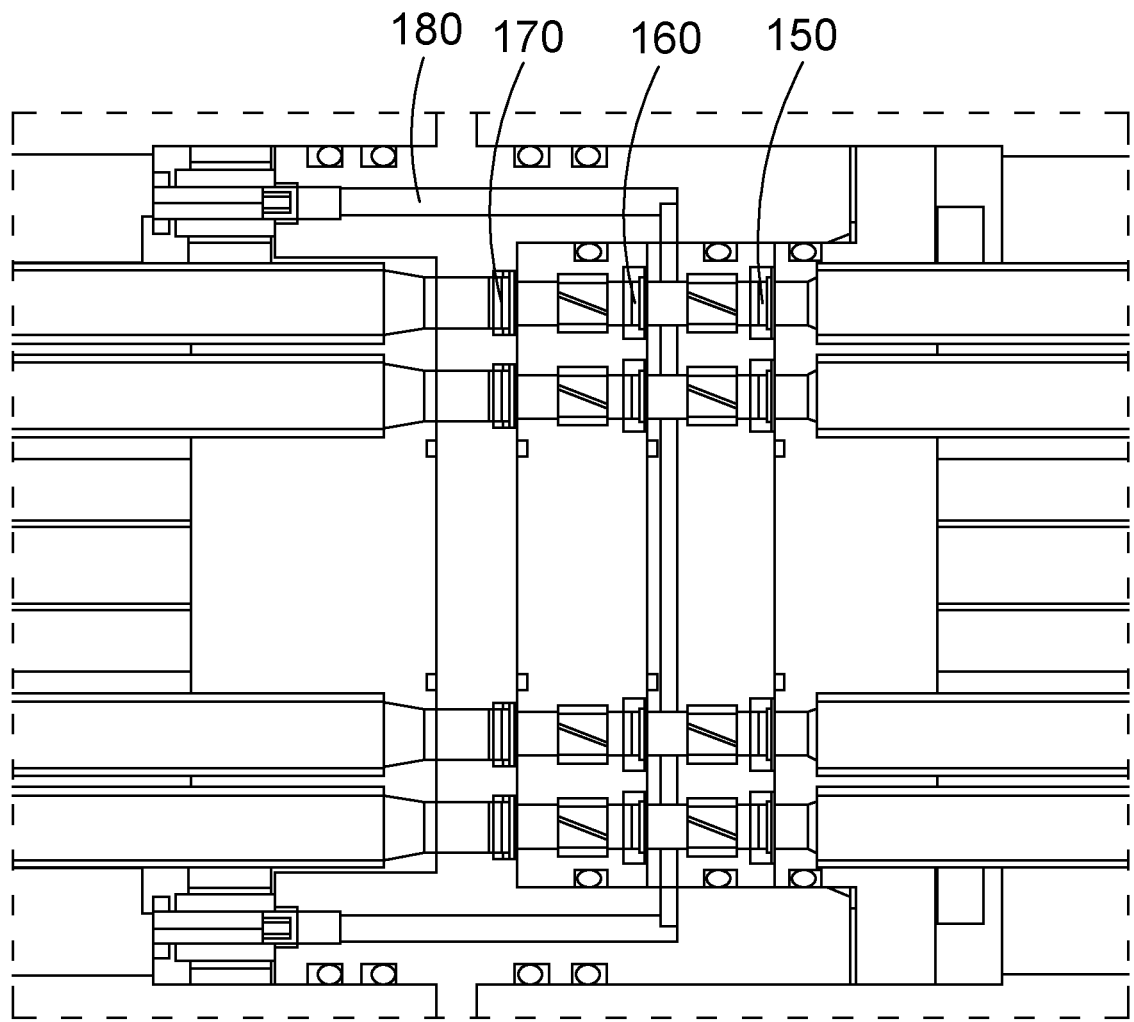
FIG. 4 depicts a side view of the seal of the robotic apparatus of FIG. 1.

As illustrated in FIG. 4, the seal 70 comprises a series of seals with a primary seal 150, a secondary seal 160 and a tertiary seal 170. The primary seal 150 is located such that it is the first seal between the pipe 40 and the external environment and the tertiary seal 170 is the seal furthest removed from the pipe 40. The use of multiple seals helps increase the security of the seal 70 as a whole, and acts as a redundancy or fail-safe mechanism.

A purging seal cavity 180 is present between the primary seal 150 and the secondary seal 160. The purging seal cavity 180 may be checked for contaminants from within the pipe to determine if the primary seal 150 has been compromised. Additionally, the purging seal cavity 180 may be filled with a known gas mixture. In this case, the composition of the gas mixture within the purging seal cavity 180 may be analysed to determine if the primary seal 150 has been compromised, or both the secondary seal 160 and tertiary seal 170 have been compromised and air from the external environment has entered the purging seal cavity 180.

It is also envisaged that the seal may contain a number of purging seal cavities, each potentially filled with a different known gas mixture, such that the failure of any one of the primary seal 150, secondary seal 160 or tertiary seal 180 can be identified in isolation.

The articulated robot 20 is built such that it is able to withstand the conditions of the confined area of a pipe 40. The articulated robot 20 is suitable for use in both high and low pressure environments, as well as in a vacuum, and can withstand hazardous and non-hazardous substances present in the pipe 40. The articulated robot 20 has an open frame structure, such that there are no voids in the articulated robot 20 and pressure is equalised between the articulated robot 20 and the pipe 40.

Within the robot control system 30 is at least one safety device that ensures that, even under power failure, the articulated robot 20 is not pushed out or pulled into the confined area due to a differential pressure between the confined area and external environment.

The articulated robot 20 can be inserted into the pipe 40 through a standard tapping point. As the drive means 60 is located outside of the pipe 40, the articulated robot 20 is sized such it can enter the pipe 40 up to an 8 inch (20 cm) diameter tapping point. The articulated robot 20 comprises a plurality of joints connecting a plurality of members. The plurality of members are attached end to end, such that the longitudinal axis of each member is substantially parallel to the longitudinal axis of the articulated robot 20. The length of the individual members decreases as the distance from the drive means 60 increases, with the longest member located at the end of the articulated robot 20 tethered or connected to the drive means 60. As such, given the members are shortest in length distal from the drive means 60, the motion of the articulated robot 20 can be controlled with greater precision at the end of the articulated robot 20 furthest removed from the robot control system 30 and drive means 60.

The articulated robot 20 further comprises a fixing portion 190 for removably retaining a tool tip 200. In the described embodiment of the invention, the tool tip 200 comprises a camera and two LED lights. In use, images and other information from the camera can be communicated through the articulated robot 20 and the robot control system 30 to the control unit 50, so that the user may respond and operate the robotic apparatus 10 accordingly. For example, the user may use a virtual reality (VR) headset to control the articulated robot 20. Additionally, the user may be able to control and operate the articulated robot 20 via monitoring images from the camera displayed on a screen. In the described embodiment, signals from the camera are communicated through the articulated robot via cables, although wireless transmission of the signal is also envisaged.

The tool tip 200 further comprises a material extraction line 210. The material extraction line 210 is configured such that unwanted material, such as fluid or material causing a blockage, can be removed from the pipe 40 during operation of the robotic apparatus 10. The articulated robot 20 comprises an extraction line 210 extending from the tool tip 200 through the articulated robot 20. The extraction line 210 is flexible such that it does not inhibit the articulation of the articulated robot 20 during use. To aid in the extraction of material, the extraction line 210 may be connected to a pump of vacuum source which depressurises the extraction line 210 such that material is removed from the pipe 40 via suction. The extraction line 210 continues through the seal 70 and terminates at a reservoir 220 external to a pipe 40. Alternatively, the extraction line 210 may feed directly into an external drain. The fluid being removed from the tool tip 200 exits via an on-line analyser which determines the constituents of the material or a particular parameter of interest.

The tool tip 200 comprises at least one tool to aid inspection and maintenance tasks, including but not limited to a location system, spectroscopy, eddy current, ultrasonic analyser and laser ablation or other physical means to remove scaling and deposits.

The invention claimed is:

1. A robotic apparatus for investigating a confined area, said robotic apparatus comprising:
   an articulated robot for insertion into a confined area,
      the robotic apparatus further comprising a robot control system for controlling said articulated robot,
      said robot control system comprising a control unit, a robot driving means, a seal for isolating the confined area from the external environment, and a plurality of transmission members,
      wherein said control unit is configured to send control signals to said robot driving means,
      wherein each transmission member within the plurality of transmission members extends through a separate aperture in said seal.

2. The robotic apparatus of claim 1, wherein said seal comprises a plurality of sealing members.

3. The robotic apparatus of claim 2, wherein said plurality of sealing members are arranged in series.

4. The robotic apparatus of claim 1, wherein said seal comprises at least one purging cavity.

5. The robotic apparatus of claim 1, wherein said articulated robot comprises a plurality of members connected by joints.

6. The robotic apparatus of claim 5, wherein each joint is associated with a transmission member such that said joint can be articulated with said transmission member.

7. The robotic apparatus of claim 5, wherein one or more joints are configured to be compliantly or passively articulated.

8. The robotic apparatus of claim 1, wherein said driving means is configured to act upon at least one transmission member to articulate said articulated robot.

9. The robotic apparatus of claim 1, wherein said driving means comprises a push rod configured to insert and remove said articulated robot into said confined area.

10. The robotic apparatus of claim 9, wherein said push rod extends into a recess or aperture within said seal.

11. The robotic apparatus of claim 9, wherein at least one transmission member extends through said push rod.

12. The robotic apparatus of claim 1, wherein each transmission member of said plurality of transmission members comprises at least one linear driving portion.

13. The robotic apparatus of claim 12, wherein each transmission member of said plurality of transmission members comprises a rotatable portion, said rotatable portion connected to said linear driving portion via a transmission coupler.

14. The robotic apparatus of claim 13, wherein said rotatable portion of said at least one transmission member is connected to a motor.

15. The robotic apparatus of claim 13, wherein said transmission coupler is located within said seal.

16. The robotic apparatus of claim 12, wherein said at least one linear driving portion of each transmission member of said plurality of transmission members comprises a cable.

17. The robotic apparatus of claim 12 wherein said at least one linear driving portion of each transmission member of said plurality of transmission members comprises a hydraulic drive.

18. The robotic apparatus of claim 12 wherein said at least one linear driving portion of each transmission member of said plurality of transmission members comprises a pneumatic drive.

19. The robotic apparatus of claim 1, wherein said seal is located proximate to said articulated robot.

20. The robotic apparatus of claim 1, wherein said articulated robot comprises a fixing portion for removably retaining a tool tip.

21. The robotic apparatus of claim 20, wherein said articulated robot comprises an extraction line extending from said fixing portion through said articulated robot.

22. The robotic apparatus of claim 21, wherein said extraction line extends through said seal.

23. The robotic apparatus of claim 21, wherein said extraction line terminates at a reservoir.

24. The robotic apparatus of claim 21, wherein the robotic apparatus comprises measurement or analysis means for analysing fluid within said extraction line.

25. The robotic apparatus of claim 20, wherein the articulated robot comprises an open framed structure.

* * * * *